B. HASKELL.
MACHINE FOR MAKING SPIRAL LATTICED POLES OR THE LIKE.
APPLICATION FILED MAR. 23, 1910.
1,013,769.
Patented Jan. 2, 1912.
5 SHEETS—SHEET 1.
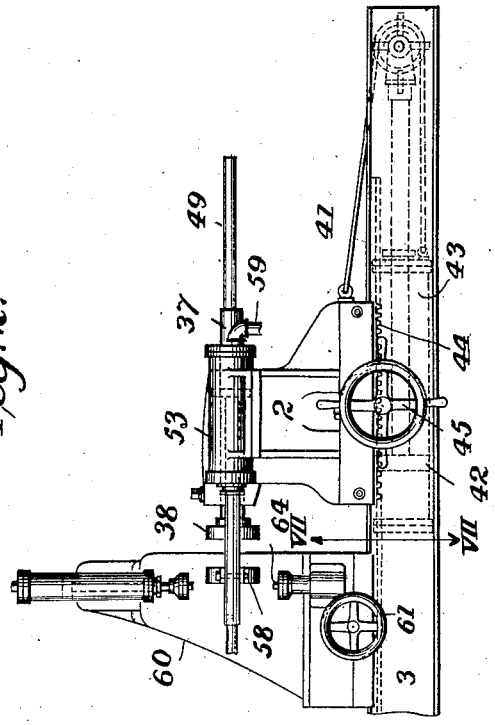
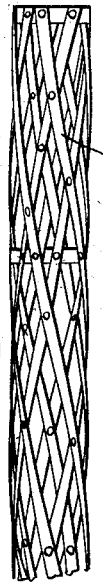
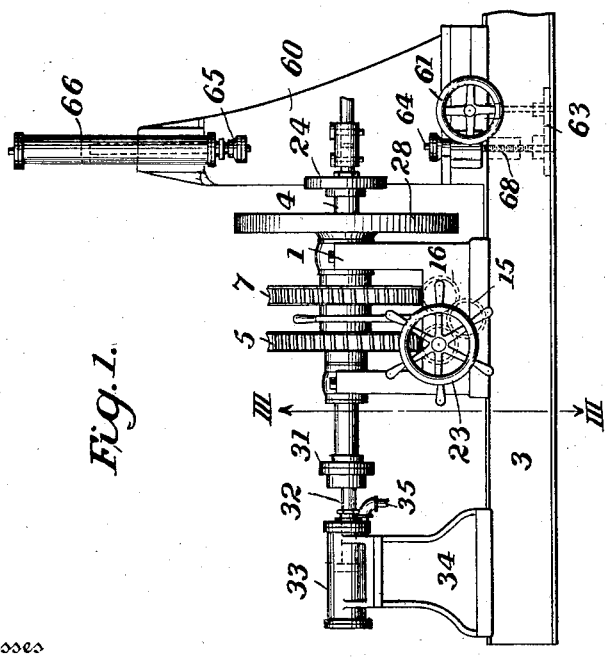
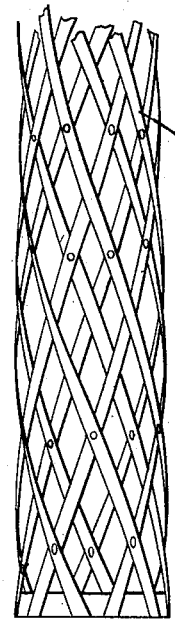
Witnesses
J. Milton Jester,
C. A. Clason
Inventor
Broderick Haskell
By W. Schoenborn
Attorney

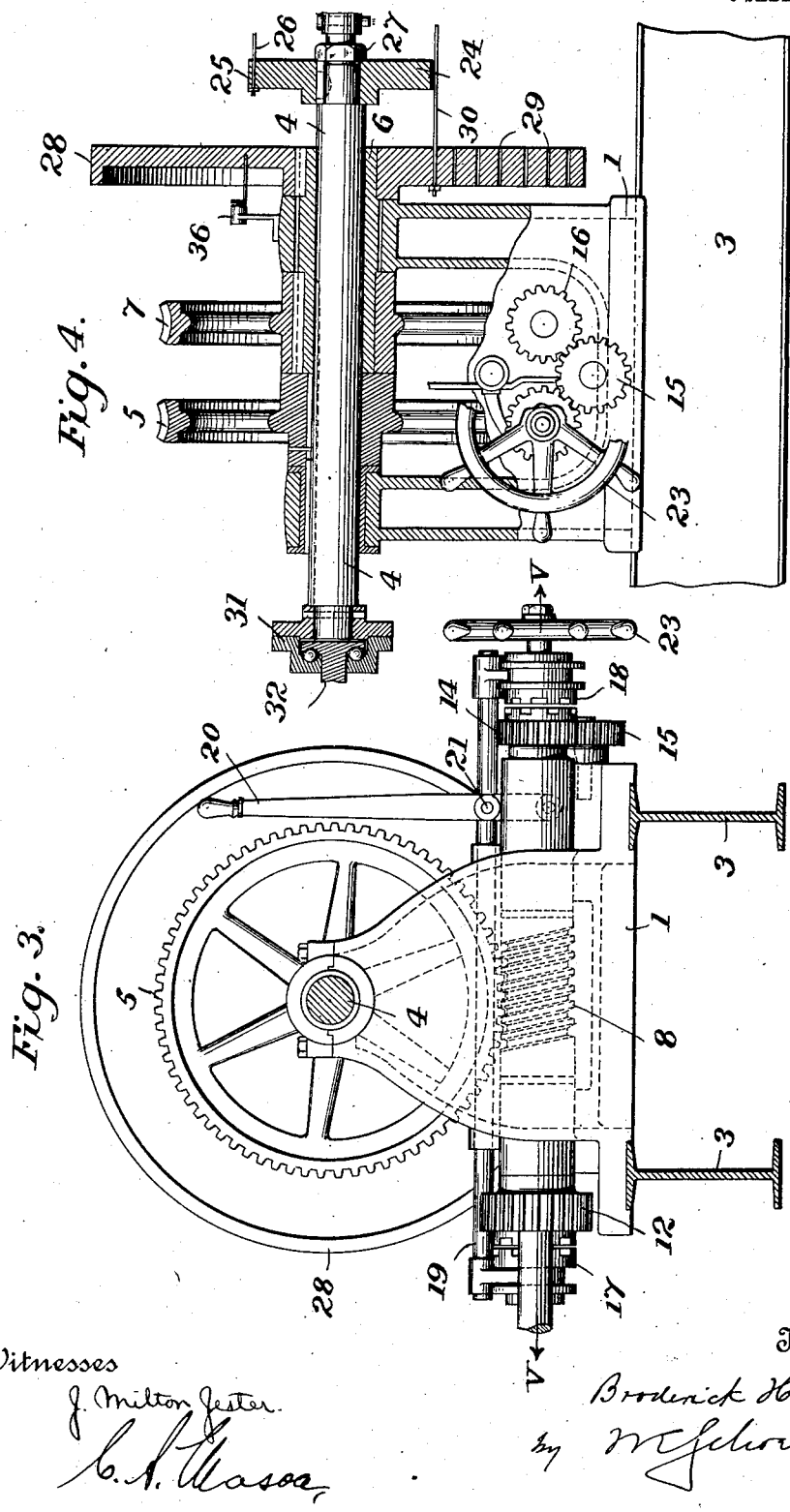

B. HASKELL.
MACHINE FOR MAKING SPIRAL LATTICED POLES OR THE LIKE.
APPLICATION FILED MAR. 23, 1910.
1,013,769.
Patented Jan. 2, 1912.
5 SHEETS—SHEET 3.
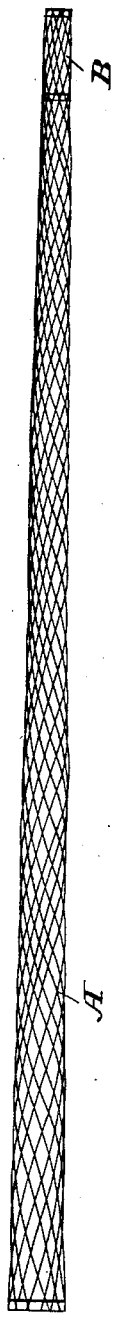
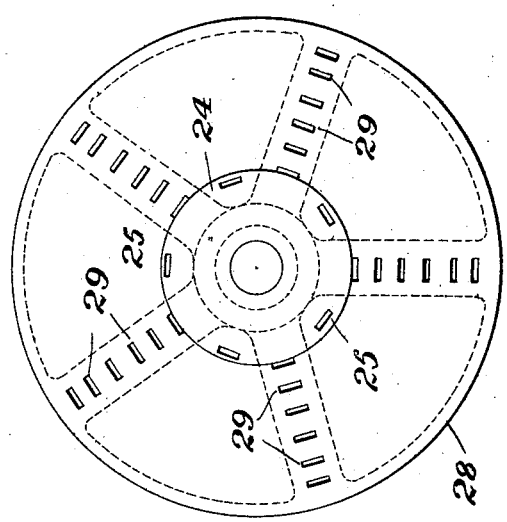
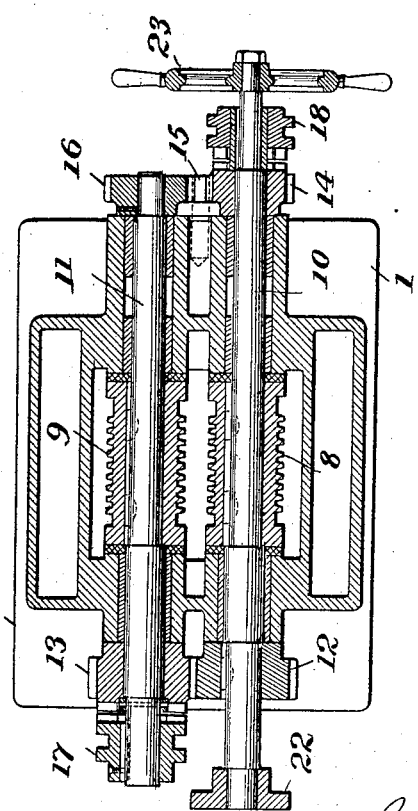
Witnesses
J. Milton Jester
C. A. Mason
Inventor
Broderick Haskell
by W. Schornbon
Attorney B. HASKELL.
MACHINE FOR MAKING SPIRAL LATTICED POLES OR THE LIKE.
APPLICATION FILED MAR. 23, 1910.
1,013,769.
Patented Jan. 2, 1912.
5 SHEETS—SHEET 4.
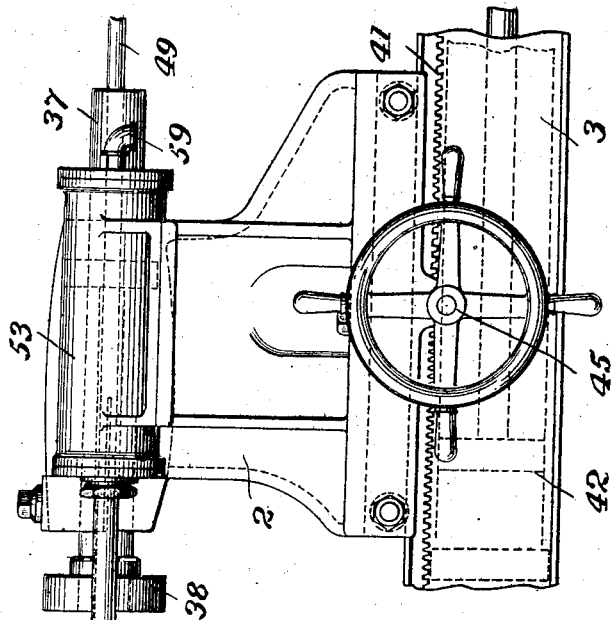
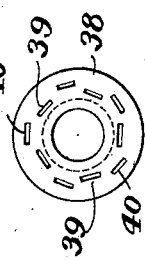
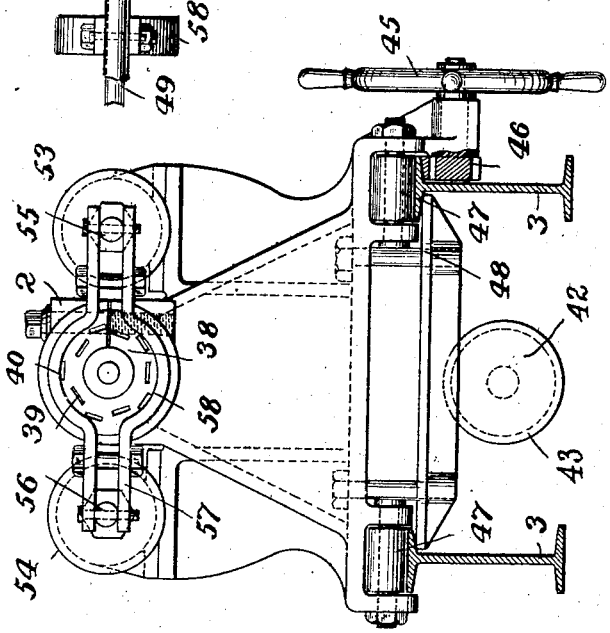
Witnesses
J. Milton Jester
C. A. Mason
Inventor
Broderick Haskell
By W. Schornborn
Attorney B. HASKELL.
MACHINE FOR MAKING SPIRAL LATTICED POLES OR THE LIKE.
APPLICATION FILED MAR. 23, 1910.
1,013,769.
Patented Jan. 2, 1912.
5 SHEETS—SHEET 5.
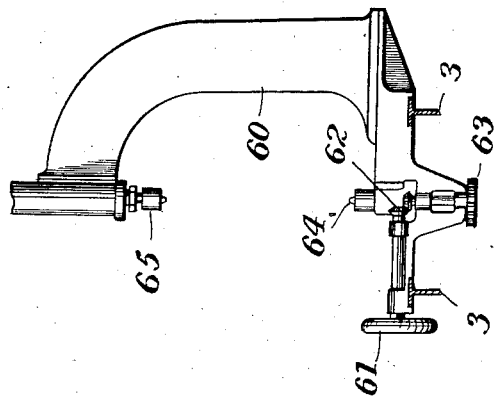
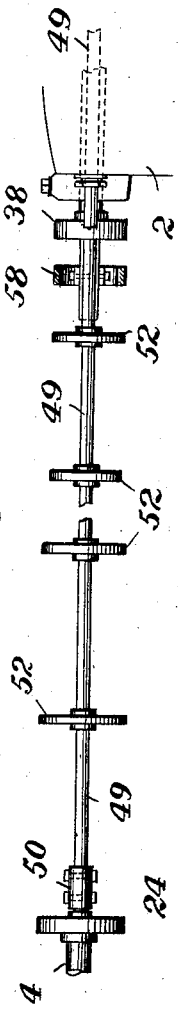

UNITED STATES PATENT OFFICE.

BRODERICK HASKELL, OF FRANKLIN, PENNSYLVANIA.

MACHINE FOR MAKING SPIRAL LATTICED POLES OR THE LIKE.

1,013,769.  Specification of Letters Patent.  Patented Jan. 2, 1912.

Original application filed December 1, 1909, Serial No. 530,753. Divided and this application filed March 23, 1910. Serial No. 551,125.

*To all whom it may concern:*

Be it known that I, BRODERICK HASKELL, a citizen of the United States, residing at Franklin, in the county of Venango and State of Pennsylvania, have invented certain new and useful Improvements in Machines for Making Spiral Latticed Poles or the Like, of which the following is a specification.

My invention has to do with the production of spiral latticed poles or structures composed of a series of metal bars interlaced and suitably secured together by welding, riveting, or the like.

The invention consists in a machine to economically produce such poles in finished form. In the embodiment shown, such machine is designed in the general form of a lathe with head and tail stocks disposed upon a suitable bed.

The matters of invention will be better understood from the following detailed description taken in connection with the accompanying five sheets of drawings wherein like reference characters designate the same parts in each of the several figures, and the matters of novelty will be pointed out particularly in the appended claims.

Referring to said drawings: Figure 1 is a side elevation of the headstock end of the machine; Fig. 2 is a like view of the tailstock end, these two views showing substantially the complete machine with the center portion broken away; Fig. 3 is an enlarged end elevation taken in section through the bed on the line III—III; Fig. 4 is an enlarged side elevation partly in central vertical section of the headstock construction; Fig. 5 is a horizontal section on line V—V of Fig. 3; Fig. 6 is a face view of the headstock carrier disks; Fig. 7 is an end view of the tailstock construction, the bed being shown in vertical section about on the line VII—VII of Fig. 2; Fig. 8 is a side view of the tailstock; Fig. 9 is a detail showing the tailstock holder disk; Fig. 10 is a detail elevation showing an apparatus for "spot-welding" the bars at their crossing points; Fig. 11 is a detail view showing a support employed for the intermediate portions of the pole; Fig. 12 is an elevation showing the pole completed; and Figs. 13 and 14 are like views on an enlarged scale of the two ends of the pole.

The headstock 1 and tailstock 2 are mounted upon a suitable bed 3 of I-beams or any other suitable construction. The headstock is provided with a shaft 4, mounted with suitable bearings, and the same has keyed in driving engagement therewith a worm-wheel driver 5.

Mounted to turn on the shaft 4 and likewise supported in bearings of the headstock is a sleeve shaft 6, having keyed thereto a worm-wheel driver 7 similar to the wheel 5. The worm wheels 5 and 7 are driven by worms 8 and 9, respectively, fixed on shafts 10 and 11 mounted in the base of the headstock. Keyed to the shaft 10 adjacent one end is a pinion 12 arranged to mesh with the pinion 13 on the shaft 11. Loosely mounted adjacent the other end of shaft 10 is a pinion 14, in geared engagement with pinion 16 fixed on shaft 11 through the intermediary pinion 15, which is mounted on a stub shaft as shown.

The clutch 17, splined to the shaft 11, is adapted to engage clutch teeth on a face of pinion 13, and thereby drive said shaft from said pinion. Likewise, a clutch 18 splined to shaft 10, is adapted to engage clutch teeth on pinion 14, and thus engage said pinion with said shaft. A rod 19, has shipper arms at its ends to engage grooves in each of said clutches to operate them simultaneously and throw one out as the other is thrown in. A hand lever 20, suitably fulcrumed in the base is pivoted at 21, to said rod to operate the same.

As shown the shaft 10, is the driver shaft and the same is provided with a coupling 22, to derive power from any suitable source. A hand wheel 23, may also be fixed to said shaft at its other end to operate the parts manually when desired.

It will be apparent that, when the clutch 17 engages the pinion 13 with the shaft 11, shafts 10 and 11, and hence worm wheels 5 and 7, and shafts 4 and 6 will be rotated in opposite directions. While when said clutch is disengaged and the clutch 18 engaged with pinion 14, shafts 10 and 11, and hence shafts 4 and 6 will be driven in the same direction on account of the intermediate pinion 15, for purposes to be hereinafter described. The shaft 4, has fixed thereto, at its inner end a holder disk 24, having therein a series of peripherally spaced apart slots 25, to receive the ends 26 of the inner series of bars which are to be latticed into poles. As shown, this disk is keyed to the shaft 4, and held thereon by a nut 27, thus this disk may be interchanged for others of different sizes in the production of poles of various dimensions. The sleeve 6 also carries a holder disk 28 which may be provided with plural series of peripherally spaced apart slots 29, to receive the ends 30 of the outer series of bars for the poles. The proper series of slots in this disk is selected so that when the bars are disposed therein they will just clear the circumference of disk 24 and lie adjacent the inner series of bars 26.

The shaft 4 is shown adapted for limited endwise movement in its bearings and driving means, and the same has a swivel connection 31 with a piston 32 disposed to operate in a fluid-pressure cylinder 33 mounted on a fixed standard 34 at the rear of the headstock 1.

It will be apparent that fluid pressure admitted to the inner end of the cylinder, as by a pipe 35, will cause an endwise tension to be exerted upon the shaft 4, and hence upon the disk holder 24 and bars 26, for a purpose hereinafter to be explained. The disk holder 28 may be provided with any suitable dial or gage 36 to indicate the number of turns given to the same in operation.

The tailstock 2 is provided with a shaft 37 carrying a holder disk 38, and this disk is provided with an inner series of spaced-apart slots 39 to receive the inner series of bars, and an outer series 40 of such slots to receive the outer series of bars. In like manner as with the disk 28, the disk 38 may if desired be enlarged and have a number of such double series of slots for different sizes of poles. As the pole structure will shorten while being twisted, the shaft 37 of the tailstock 2, is arranged for a longitudinal movement toward and away from the headstock. As shown, the tailstock 2 as a whole is bodily movable and an outward tension thereon is exerted by the band 41, from the piston 42 in fluid-pressure cylinder 43, fluid pressure being admitted to this cylinder in any usual manner for this purpose. The tailstock may also have formed thereon a bracket to receive a pinion 46, to engage a rack 44 on the bed, said pinion being actuated by hand-wheel 45. The tailstock may also be provided with rollers 47 for engagement with the top of the bed and with any suitable cross bar 48 or the like to retain the same in place.

A rod 49 is engaged with the end of the shaft 4 and passes through the shaft 37 which is hollow for this purpose; and said rod carries a series of spaced apart and adjustable disks 52, of proper graduated sizes to support the bars between the headstock and tailstock as they are being twisted into latticed form.

Referring to Figs. 12, 13, and 14, it is desirable that the pole A should be of cylindrical form for a certain distance at the top as shown at B. To effect this result, I mount fluid-pressure cylinders 53 and 54 at either side of the tailstock, the pistons 55 and 56 thereof being united by a yoke 57, having a central cylindrical portion 58. This portion 58 is of a size to snugly slip over the end of the pole when the same is latticed, and fluid pressure may be admitted to said cylinders 53 and 54, by a conduit 59, to operate the same.

In operation after the bars are given the required number of twists, they are secured together by riveting, welding or otherwise fastening portions thereof sufficiently to effect rigidity, after which the portion 58 of the yoke is forced over the small end of the pole as described, which will result in compressing the bars and decreasing the diameter of the pole adjacent this end to the required extent and so as to bring the same to a cylindrical form. It is apparent that the outside series of bars of the pole will shorten more than the inside series and for this reason a relative movement is provided for between these parts by the construction of the holder 24 and shaft 4 as movable against the yielding pressure exerted by the fluid pressure cylinder 33 as hereinbefore described.

From the construction of the driving means for the holders 24 and 28 as before described, it will be apparent that said holders may be revolved either in opposite directions at uniform speed for the latticing operation or in the same direction at uniform speed. This latter movement is employed to turn the pole as a whole after the latticing is complete to effect the fastening of the bars together. This turning of the pole may be effected by the hand wheel 23.

As before explained the bars composing the pole may be secured together at their crossing points in any desired manner. I have shown a means for "spot-welding" the bars together electrically, said means consisting of one or more supports 60 adjustable along the bed in any desired manner. These supports may carry vertically adjustable anvils 64, such adjustment being effected by a hand wheel 61 operated through a gearing 62, which turns the gears 63, and effects a screw adjustment 68. The co-acting welding element 65 may be vertically operated by a piston 66. The details of such apparatus may be of any preferred or usual type and form no part of the present invention.

After the bars composing the latticed pole have been sufficiently secured together, so that their proper relation with each other will not be displaced by handling, the hollow pole with its contained forming mandrel may be removed to any suitable place and finished up as desired, then another mandrel which has been removed from a finished pole is properly adjusted in the machine, after which bars are again inserted and secured in the head and tail stocks and the operations explained repeated for making another hollow latticed pole.

I do not herein claim the method carried out by the machine shown and described in this application, as this is the subject-matter of my companion application, filed Dec. 1, 1909, Serial No. 530,753 of which this application is a division.

Having now fully described my invention what I claim as new and desire to secure by Letters Patent is as follows:

1. A machine of the type set forth comprising oppositely arranged non-rotatable and rotatable supports for holding in spaced relation plural series of bars, and means for rotating said rotatable supports for fashioning the bars into a latticed pole.

2. A machine of the type set forth comprising oppositely arranged non-rotatable and rotatable supports for holding in spaced relation an inner and an outer series of bars and means for rotating said rotatable supports for twisting the bars into a latticed pole.

3. A machine of the type set forth comprising oppositely arranged non-rotatable and rotatable supports for holding in spaced relation plural series of bars, and means for rotating said rotatable supports in opposite directions to form the bars into a latticed pole.

4. A machine of the type set forth comprising a non-rotatable support and oppositely arranged rotatable supports for holding bars of an inner series in fixed relation, and bars of an outer series in fixed relation adjacent said inner series, and means to rotate said rotatable supports simultaneously in opposite directions.

5. A machine of the type set forth comprising a holder to hold one end of a set of bars in a circular and spaced relation and against twisting movement, a rotary holder for securing and twisting the other ends of certain of said bars in one direction, and a rotary holder for simultaneously twisting the ends of other of said bars in the opposite direction.

6. A pole latticing machine, comprising a support adapted to hold one end of a set of bars in a circular and spaced section and against twisting movement, a plurality of rotatable bar holders oppositely arranged to said support, means for rotating one of said holders in one direction and the other in the opposite direction and means for exerting a longitudinal tension on one of said holders.

7. A pole latticing machine, comprising a support for one end of an inner and outer series of bars, a holder for the other end of the inner series of the bars, a second holder for the other end of the outer series of bars, means for rotating said holders simultaneously in opposite directions, and optionally rotating the holders synchronously in the same direction.

8. A pole latticing machine adapted to hold one end of a set of bars in a circular and spaced relation and against twisting action, a plurality of rotatable bar holders oppositely arranged to said support and adapted to support said set of bars into tapered form, means for rotating one of said holders in one direction and the other in the opposite direction to form a latticed pole.

9. A pole latticing machine adapted to hold one end of a set of bars in a circular and spaced relation and against twisting action, a plurality of rotatable bar holders oppositely arranged to said support and adapted to support said set of bars in a tapered form, means for rotating one of said holders in one direction and the other in the opposite direction to form a latticed pole, and means arranged within said latticed pole for supporting the same when formed.

10. A pole latticing machine adapted to hold one end of a set of bars in a circular and spaced relation and against twisting action, a plurality of rotatable bar holders oppositely arranged to said support and adapted to support said set of bars in a tapered form, means for rotating one of said holders in one direction and the other in the opposite direction to form a latticed pole, means arranged within said latticed pole for supporting the same when formed, and means for reducing the small end of said pole to a cylindrical form.

11. A pole latticing machine adapted to hold one end of a set of bars in a circular and spaced relation and against twisting action, a plurality of rotatable bar holders oppositely arranged to said support and adapted to support said set of bars in a tapered form, means for rotating one of said holders in one direction and the other in the opposite direction to form a latticed pole, means arranged within said latticed pole for supporting the same when formed, and means for uniting the bars together at the points of junction.

12. A machine of the type set forth comprising supports for holding the ends of bars of an inner series in fixed relation, supports for holding the ends of bars of an outer series in fixed relation adjacent said inner series, means to twist one and the adjacent ends of said inner and outer series of bars simultaneously in opposite directions, and means for supporting the bars in a hollow pole relation to each other.

13. A machine for forming latticed poles, comprising a headstock, a rotatable holder journaled therein, a second rotatable holder mounted concentrically with said first holder, a driver for said holders, and connections for causing said holders to turn in opposite directions, or the same direction at option.

14. A machine for forming latticed poles, comprising a headstock, a plurality of rotatable holders concentrically mounted therein, means for turning said holders in opposite directions, a tailstock having a holder thereon, and means permitting a movement of relative approach between said head and tail stock.

15. A machine for forming latticed poles, comprising a headstock, a plurality of rotatable holders concentrically counted therein, means for turning said holders in opposite directions, a tailstock having a holder thereon, means permitting a movement of relative approach between said head and tail stocks, and means offering a determinate yielding resistance to such movement.

16. A machine for forming latticed poles, comprising a headstock, a plurality of rotatable holders mounted thereon, means for turning said holders in opposite directions, means permitting one of said holders to move lengthwise relative to another under yielding resistance, and a tailstock mounted opposite said headstock.

17. A machine of the type set forth, comprising means to hold one end of a set of bars in spaced relation and against twisting movement, means for twisting the other ends of certain of said bars in one direction and for simultaneously twisting the ends of other of said bars in the opposite direction, and a mandrel having a series of adjusting disks for supporting the bars in a hollow pole relation to each other.

In testimony whereof I affix my signature in presence of two witnesses.

BRODERICK HASKELL.

Witnesses:
B. A. KRENZ,
L. A. ARNOLD.

---

Copies of this patent may be obtained for five cents each, by addressing the "Commissioner of Patents, Washington, D. C."